United States Patent
Chen et al.

(10) Patent No.: US 6,842,269 B2
(45) Date of Patent: Jan. 11, 2005

(54) IMAGE READING DEVICE BY INTERFERING LIGHT PATH TO TRIGGER SCANNING PROCESSES

(75) Inventors: Hsi-Min Chen, Hsin-Chu (TW); Te-Chih Chang, Hsin-Chu (TW); Dai-Li Chang, Taipei (TW)

(73) Assignee: Mustek Systems Inc. (TW)

( * ) Notice: Subject to any disclaimer, the term of this patent is extended or adjusted under 35 U.S.C. 154(b) by 659 days.

(21) Appl. No.: 09/826,099

(22) Filed: Apr. 5, 2001

(65) Prior Publication Data

US 2002/0145771 A1 Oct. 10, 2002

(51) Int. Cl.$^7$ .............................. H04N 1/04; H04N 1/32
(52) U.S. Cl. ...................... 358/474; 358/475; 358/486; 358/468
(58) Field of Search .................. 358/475, 400, 358/468, 483, 486, 509, 474, 512, 514, 513, 471, 497; 250/559.04, 559.12, 208.1, 234–236; 382/317, 318, 313

(56) References Cited

U.S. PATENT DOCUMENTS

| | | | | |
|---|---|---|---|---|
| 5,900,950 A | * | 5/1999 | Hsu | 358/497 |
| 5,917,616 A | * | 6/1999 | Chou et al. | 358/488 |
| 6,163,388 A | * | 12/2000 | Lee et al. | 358/488 |
| 6,268,599 B1 | * | 7/2001 | Chen et al. | 250/208.8 |

* cited by examiner

Primary Examiner—Cheukfan Lee
(74) Attorney, Agent, or Firm—Lowe Hauptman Gilman & Berner, LLP

(57) ABSTRACT

The image reading device includes a scanning module and a light interference module. The user may use the light interference module to interfere the light path to trigger the scanning processes from a standby mode. When the light path is interfered, the image sensor would generate different image signal output. In this case, by detecting the difference of image signal output pattern, the image reading device would be triggered to load specific scanning control parameters to perform the scanning, such as starting the scanning programs and driving the scanning module to an initial position for completing the scanning.

13 Claims, 6 Drawing Sheets

IMAGE READING DEVICE BY INTERFERING LIGHT PATH TO TRIGGER SCANNING PROCESSES

BACKGROUND OF THE INVENTION

1. Field of the Invention

The present invention generally relates to an image reading device which employs analog output result from the image sensor by the interference of a light path to start preset scanning processes.

2. Background Description

Scanning devices have been broadly employed to input images. Especially when the personal computer is popular, the scanning device is able to scan a document and thus transform to a digitalized image format. Users can therefore edit, make copies and/or store in a storage device. However, most of the users want a convenient way to start scanning rather than to start scanning application software first as an ordinary procedure of scanning.

Prior known image reading devices are developed to have a switching button. When the user pushes the switching button, the image reading device is initialized to start the scanning. Please refer to FIG. 1. The prior known image reading device 1 includes a body 10, a push button 11, a button base 12, a controlling board 13, a signal cable 14, a scanning module 15, a driving module 16, a document plate 17 and a data bus 18. The scanning module 15 further includes a light source 151, an image sensor 152, a mirror 153 and a focusing lens 154. The image sensor 152 is a CCD (Charged Couple Device) or a CIS (Contact Image Sensor) for generating analog signal output by sensing the light input. When the user wants to proceed the scanning, the user firstly has to place a document on the document plate 17 and pushes the push button 11. When the push button 11 moves down to the button base 12, there is generated a trigger signal to the controlling board 13 via the signal cable 14. A preset process or mode is therefore started such as initialing to scan or to start the scanning program. Accordingly, the preset mode may contain some parameters determined by the user. After the initialization, the light source 151 provides a light to the document and being reflected by the document to the mirror 153. The mirror 153 reflects the light to the focusing lens 154. The light containing image information would be focused on the image sensor 152 for outputting image signals. Once the above process is done, the driving module 16 advances the scanning module to the direction shown as arrow legend in the FIG. 1. All the image signals are transmitted through the data bus 18 to the controlling board 13 for signal processing purposes.

In view of the above mentioned image reading device, every element (including the push button 11, the button base 12, the signal cable 14 and so on) are needed to complete the scanning processes. In this case, the cost of the image reading device can be effectively reduced.

Regarding to the forgoing disadvantages of the prior known image reading device, the present invention provides an image reading device to trigger scanning process by detecting the interference of a light path. The light interference mechanism may be utilized with a clip by pushing, moving or rotating methods to interrupt or interfere the light path in order to stop the light being focused on the image sensor. In this case, the output signal from the image sensor may also be changed and detectable for the interference. Thus, the initialization of the image reading device is able to be triggered. Moreover, the image reading device is able to start based on a preset mode by the user to perform a predetermined scanning process.

SUMMARY OF THE INVENTION

It is therefore an object of the present invention to provide an image reading device without costly a push button or a button base to trigger the scanning process. Instead, a light interference mechanism is employed to trigger and initialize the scanning processes. In this case, the cost and assembling complex would be reduced along with a small body size.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
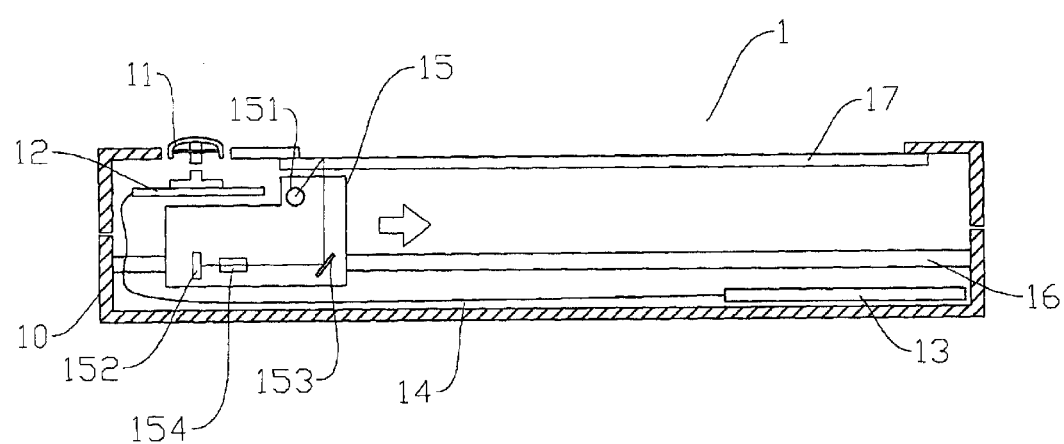
FIG. 1 is a prior known image reading device.
Figure 2A:
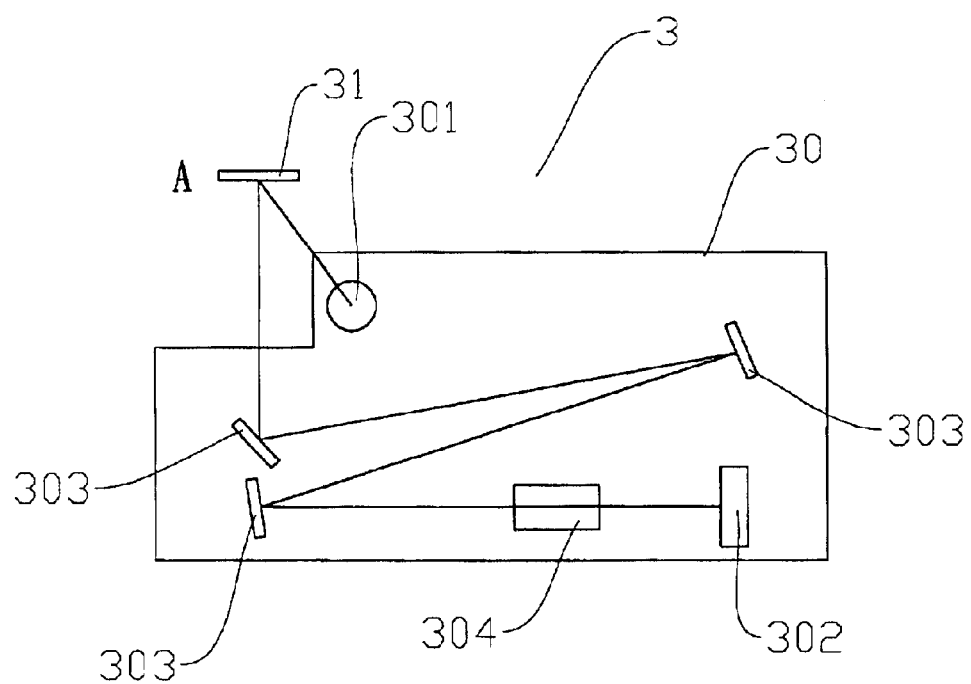
FIG. 2A shows the first embodiment of the present invention utilized with a light interference mechanism at a first position which does not interfere the light path.
Figure 2B:
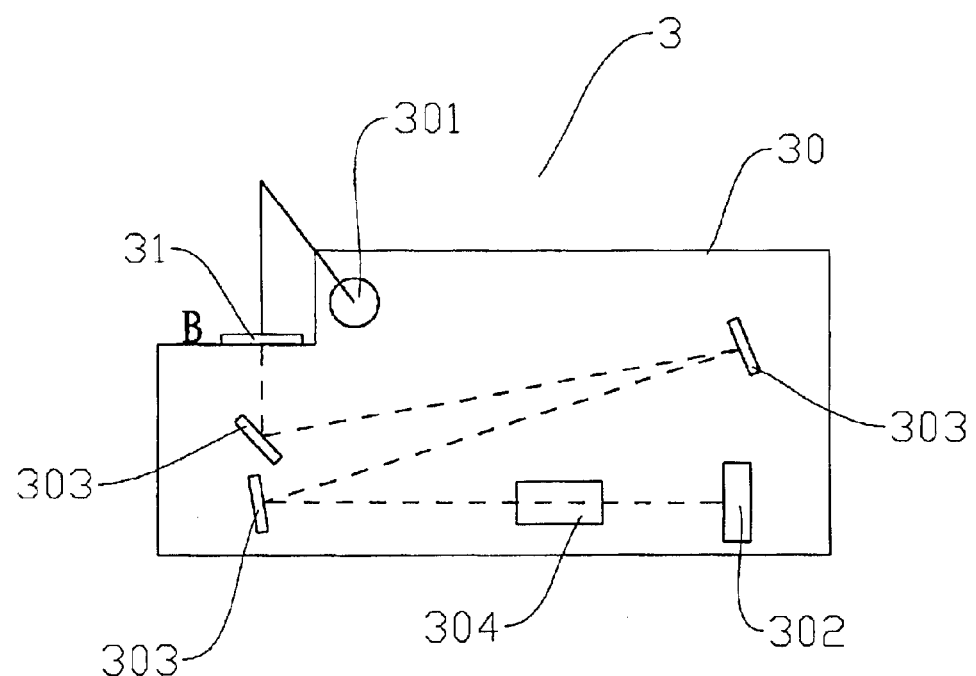
FIG. 2B shows the first embodiment of the present invention utilized with a light interference mechanism at a first position which interferes the light path.

Please refer to FIGS. 2A and 2B. FIGS. 2A and 2B show the first embodiment of the present invention. The image reading device 3 at least includes a scanning module 30 and light interference module 31. The scanning module 30 is the same as the scanning module 15 shown in FIG. 1. The scanning module 30 has a light source 301, an image sensor 302, a mirror 303 and a focusing lens 304. The light interference module 31 is a mechanism which is able to move vertically. The user may push, move or rotate the mechanism to interfere the light path by fully interruption or partial interruption. The mechanism may be a simple clip or plate to conduct this function.

Figure 3:
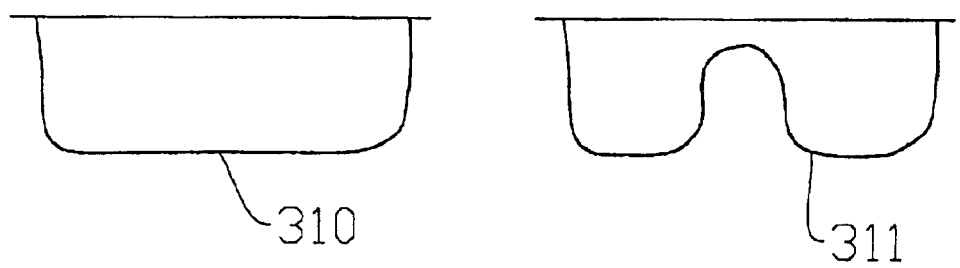
FIG. 3 shows output image signals from the image sensor without and with light interference occurred respectively.

When the reading device 3 is under a standby mode, the scanning module was previously driven by a driving module to a standby position, such as the position shown in FIG. 2A. In this position, the light source 301 is able to project light to the light interference module 30 and further the light is reflected to plural mirrors 303. By the reflection of the mirrors, the light is focused on the image sensor 302 through the help of the focusing lens 303. The image sensor 302 transform the light to analog signals such as left side signals shown in FIG. 3. When the user would like to proceed the scanning process, the user may push, move or rotate the light interference module 31 from legend A position to lower position legend B as shown in FIG. 2B to interfere the light path, making the light unable to advance to the mirrors and image sensor. In this case, the image sensor would not generate image signals and thus output the image signals as the right side pattern shown in FIG. 3. The image reading device is therefore able to start a predetermined scanning process and load specific parameters set by the user previously to complete all need scanning processes.

Figure 4A:
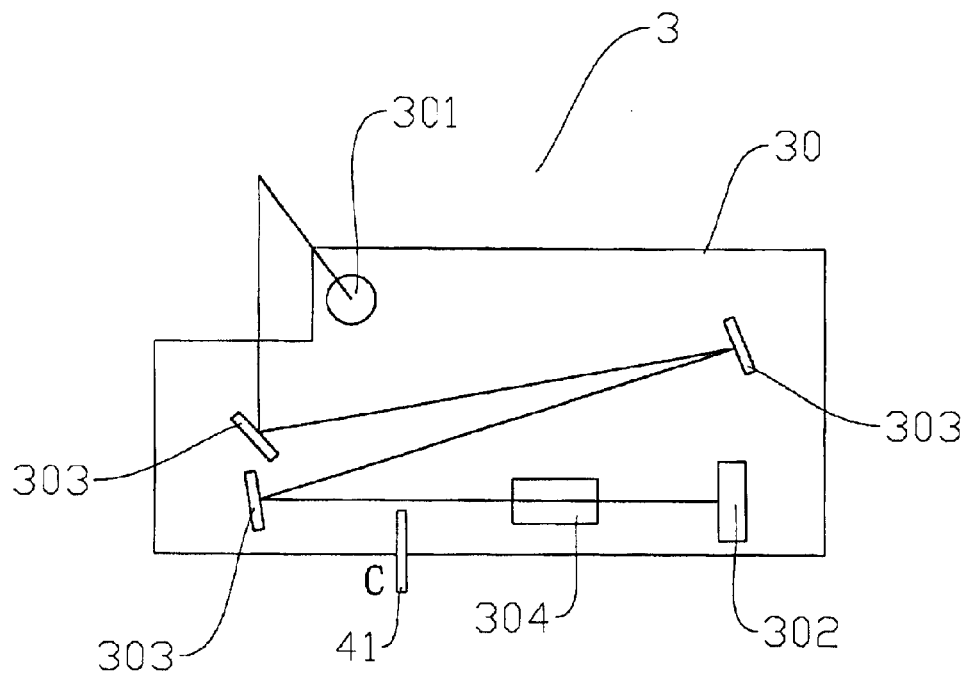
FIG. 4A shows the cross section of the second embodiment of the present invention.
Figure 4B:
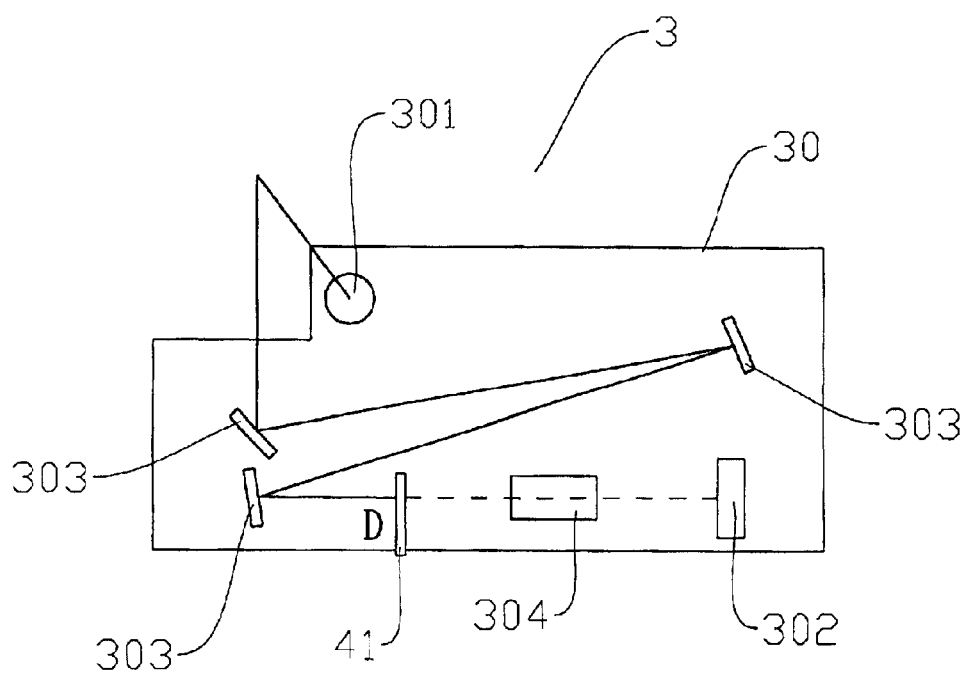
FIG. 4B shows the cross-section of the second embodiment of the present invention when the light interference is occurring.

FIGS. 4A and 4B show the second embodiment of the present invention. The difference between the first embodiment and the second embodiment is the positions of the light interference module 41. In the second embodiment, when the user would like to proceed the scanning process, the user may push, move or rotate the light interference module 41 from legend C position to lower position legend D as shown in FIG. 4B to interfere the light path, making the light unable to advance to the mirrors and image sensor. In this case, the image sensor would not generate image signals and thus trigger the image reading device to proceed a predetermined scanning process, such as driving the scanning module to an initial position, and load specific parameters set by the user previously to complete all need scanning processes.

Figure 5A:
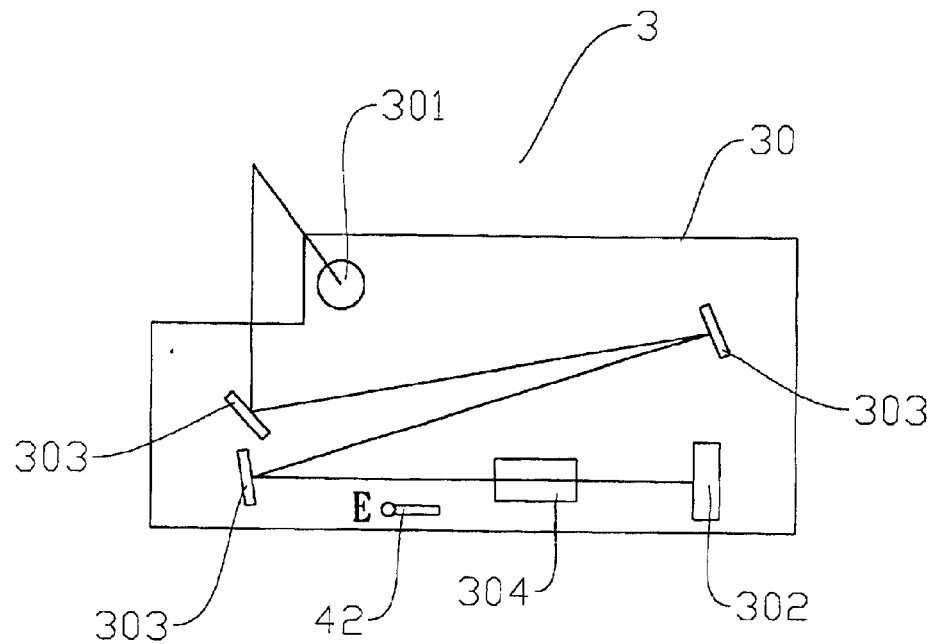
FIG. 5A shows the cross section of the third embodiment of the present invention.
Figure 5B:
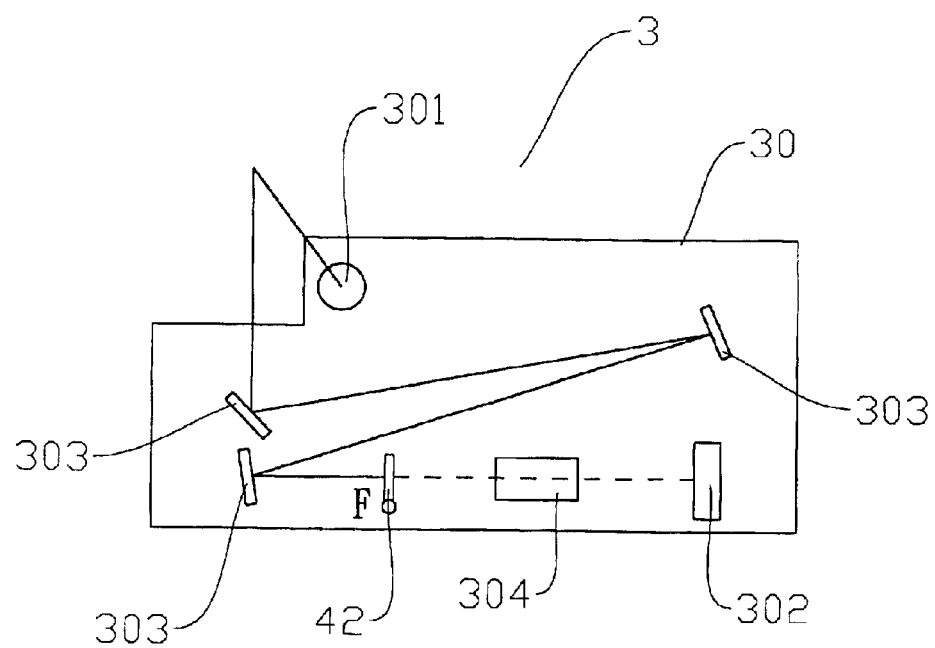
FIG. 5B shows the cross section of the third embodiment of the present invention when the light interference is occurring.

FIGS. 5A and 5B show the third embodiment of the present invention. In the third embodiment, when the user would like to proceed the scanning processes, the user may push, move or rotate the light interference module 42 from legend E position shown in FIG. 5A to lower position legend F shown in FIG. 4B to interfere the light path, making the light unable to advance to the mirrors and image sensor. In this case, by the difference of generated image signals, the image reading device would directly begin some predetermined scanning processes, such as driving the scanning module to an initial position, and load specific parameters set by the user previously to complete all need scanning processes.

In view of the foregoing embodiments, the image reading device is driven to a standby position under a standby mode. When the user employs the light interference module to interfere the light path to stop the light advanced to the image sensor. By detecting the change of the out signals of the image sensor, the image reading device would be triggered to proceed a predetermined scanning process by loading preset scanning control parameters. On the other hand, it would be the standby mode that the light path is interfered by the light interference module. Therefore, if the light path is not interfered, the image reading device would start some predetermined scanning processes, such as driving the scanning module to an initial position, and load specific parameters set by the user previously to complete all need scanning processes.

Accordingly, there would be plural light interference modules or the interfered light path would be segmented in the present invention. Different light interference modules or different interfered segments would be preset different functions, such as scanning, copying, faxing and email transferring.

Figure 6:
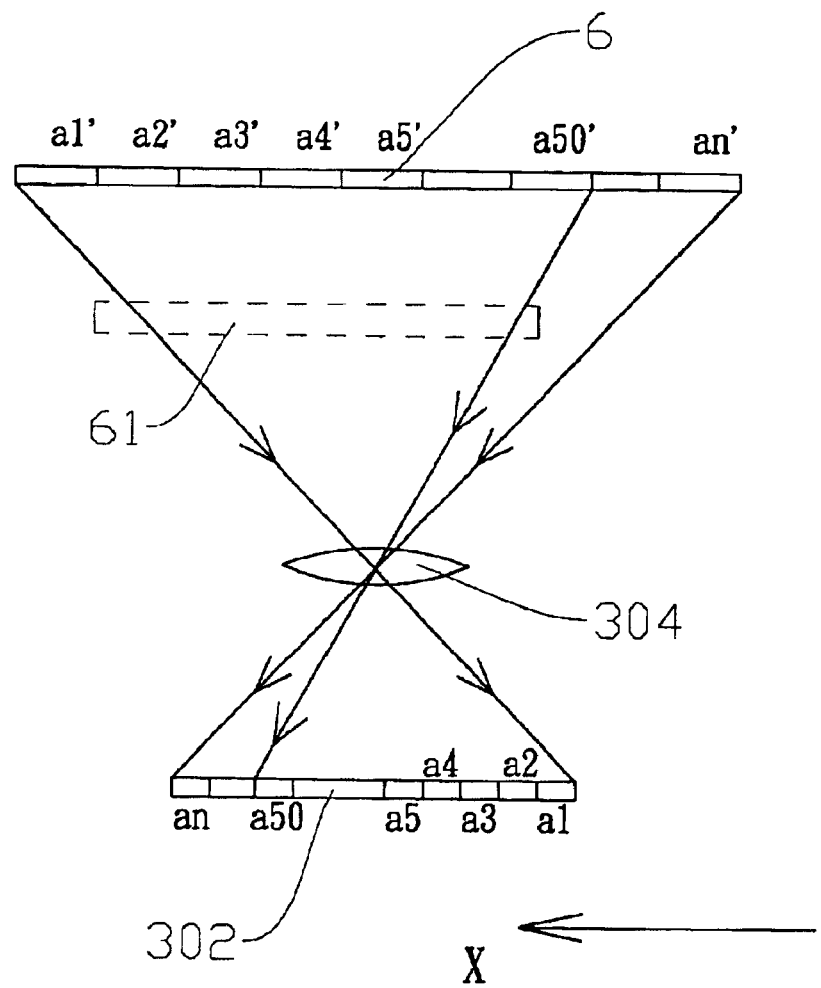
FIG. 6 shows detections of the image sensor when the light is interfered.

The details of segments of light path are demonstrated in FIG. 6. After the reflection of light, the image of an object 6 is focused on the image sensor 302 through the focusing lens 304. The image sensor 302 contains plural segments such as a1, a2, a3, a4, . . . along the direction of X axis. The different segments of the image sensor reflects the corresponding segments of the object 6 such as a1', a2', a3', a4' . . . Therefore, when the segments of a1' to a4' are masked or interfered, the image reading device is able to response a predetermined setting of scanning processes since the light is unable to advance to segments of a1 to a4 of the image sensor. The scanning processes may be a copying procedure. Further, when the segments of a5' to a5' are masked or interfered, the image reading device is able to response another predetermined scanning mode, such as faxing or sending scanned image to friends on Internet.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An image reading device comprising:
   a light source for providing a light;
   an image sensor for sensing an image and generating analog image signals; and
   a light interference module for interfering said light through a light path to said image sensor,
   wherein said light interference module interferes said light into said image sensor by plural segments which reflect different functions and thus triggers the image reading device to perform a predetermined procedure by each said segment.

2. The image reading device of claim 1, further comprising:
   a focusing lens placed before said image sensor, for focusing said image on said image sensor.

3. The image reading device of claim 1, further comprising:
   a mirror for reflecting said light.

4. The image reading device of claim 1, wherein said image sensor is a charge-coupled device.

5. The image reading device of claim 1, wherein said image sensor is a contact image sensor.

6. The image reading device of claim 1, wherein said light interference module stops said light projecting into said image sensor.

7. The image reading device of claim 1, wherein said light interference module is able to move vertically to stop said light projecting into said image sensor.

8. The image reading device of claim 1, wherein said light interference module is able to move perpendicular to said light in order to stop said light projecting into said image sensor.

9. The image reading device of claim 1, wherein said light interference module is able to stop said light projecting into said image sensor by a rotating movement.

10. The image reading device of claim 1, wherein said predetermined procedure is to performing scanning.

11. The image reading device of claim 1, wherein said predetermined procedure is to starting a scanning program.

12. An image reading device comprising:
    a light source for projecting a light;
    a segmented image sensor for detecting plural segments of said light; and
    a light interference module for segmentalizing said light into a segmentalized light by vertical movement,
    wherein a designated procedure is activated in corresponding to said segmentalized light.

13. An image reading device comprising:
    a light source for projecting a light;
    a segmented image sensor for detecting plural segments of said light; and
    a light interference module for segmentalizing said light into a segmentalized light by rotational movement,
    wherein a designated procedure is activated in corresponding to said segmentalized light.

* * * * *